United States Patent
Tian et al.

(10) Patent No.: US 8,176,195 B2
(45) Date of Patent: May 8, 2012

(54) MEDIA DISTRIBUTION WITH SERVICE CONTINUITY

(75) Inventors: Jun Tian, Plainsboro, NJ (US); Ye-Kui Wang, Bridgewater, NJ (US); Yu Huang, Bridgewater, NJ (US); Hong Heather Yu, West Windsor, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 83 days.

(21) Appl. No.: 12/618,537

(22) Filed: Nov. 13, 2009

(65) Prior Publication Data

US 2011/0119324 A1    May 19, 2011

(51) Int. Cl.
G06F 15/16 (2006.01)

(52) U.S. Cl. ........ 709/231; 709/203; 709/223; 709/232; 709/246

(58) Field of Classification Search .......... 709/203, 709/223, 231, 232, 246; 725/28
See application file for complete search history.

(56) References Cited

U.S. PATENT DOCUMENTS

| | | | |
|---|---|---|---|
| 4,390,904 A | 6/1983 | Johnston et al. | |
| 5,696,866 A | 12/1997 | Iggulden et al. | |
| 7,746,836 B2 * | 6/2010 | Jentz et al. | 370/338 |
| 7,761,900 B2 * | 7/2010 | Crayford | 725/87 |
| 2005/0120368 A1 * | 6/2005 | Goronzy et al. | 725/28 |
| 2005/0154973 A1 | 7/2005 | Otsuka et al. | |
| 2006/0123131 A1 | 6/2006 | Almaula et al. | |
| 2007/0136459 A1 * | 6/2007 | Roche et al. | 709/224 |
| 2008/0032695 A1 * | 2/2008 | Zhu et al. | 455/442 |
| 2008/0089290 A1 * | 4/2008 | Coulas et al. | 370/331 |
| 2008/0092224 A1 * | 4/2008 | Coulas et al. | 726/12 |
| 2008/0183645 A1 * | 7/2008 | Burger et al. | 706/12 |
| 2008/0256590 A1 * | 10/2008 | Oosterholt | 725/135 |
| 2009/0142033 A1 | 6/2009 | Schmouker et al. | |
| 2010/0250753 A1 * | 9/2010 | Song et al. | 709/227 |
| 2010/0325286 A1 * | 12/2010 | Song et al. | 709/227 |

FOREIGN PATENT DOCUMENTS

| | | |
|---|---|---|
| CN | 1910580 A | 2/2007 |
| CN | 101064846 A | 10/2007 |
| CN | 101080923 A | 11/2007 |
| WO | WO 2010054698 A1 * | 5/2010 |

OTHER PUBLICATIONS

Li et al., "Seamless IP Multimedia Service Continuity Support in Inter-worked UMTS and WLAN," The 18th Annual IEEE Symposium on PIMRC'07.*

$3^{rd}$ Generation Partnership Project; Technical Specification Group Services and System Aspects; "Vocabulary for 3GPP Specifications", Release 10, 3GPP TR 21.905 V10.0.0, Sep. 2009, pp. 1-57. Kwak, J.-Y., "Follow-Me Services Framework Using the Session Initiation Protocol", ETRI, Korea, Dec. 18, 2007, pp. 1-14.

Van De Sluis, R., et al., "User Interface for an In-Home Environment", Human Computer Interaction, INTERACT '01, Tokyo, Jul. 2001, pp. 383-390.

International Search Report, International Application No. PCT/CN2010/078583, Applicant: Huawei Technologies Co., Ltd., May 2011, 3 pages.

* cited by examiner

Primary Examiner — Oanh Duong
(74) Attorney, Agent, or Firm — Slater & Matsil, L.L.P.

(57) ABSTRACT

System and methods for media distribution are described. In one embodiment, a method of media distribution includes rendering of a media to a user, stopping the rendering of the media, and storing remaining media not rendered to the user in a user server. The method further includes receiving a request to stream the remaining media to the user, dividing the remaining media into segments, and assigning a priority to each segment. The remaining media is streamed, leaving out segments with priority lower than a threshold priority.

36 Claims, 3 Drawing Sheets

MEDIA DISTRIBUTION WITH SERVICE CONTINUITY

TECHNICAL FIELD

The present invention relates generally to service continuity and more particularly to media distribution with service continuity.

BACKGROUND

Session continuity is the uninterrupted user experience of a session or service when a user session is interrupted and restarted through a different device or network, for example, due to a geographic transition. In the restarted session, for live transmissions, the delay caused by the service interruption creates a time gap between the live transmission and the user's session. This time gap can cause inconvenience to the user unless removed. One way of overcoming this problem is to avoid restarting the session from the point where the prior session was interrupted. However, such a solution defeats the purpose of session continuity which is to have uninterrupted user experience.

SUMMARY OF THE INVENTION

In various embodiments, the invention overcomes the time gap problem without degrading session continuity.

In accordance with an embodiment of the present invention, a method for media distribution comprises stopping the rendering of a media to a user, and storing remaining media not rendered to the user in a user server. The method further comprises receiving a request to stream the remaining media to the user, and dividing the remaining media into segments and assigning a priority to each segment. The remaining media is streamed leaving out segments with priority lower than a threshold priority.

In accordance with another embodiment of the present invention, a method for media distribution comprises storing and transmitting media of a live event to a user through a first network, and interrupting the transmission to the user. The method further comprises receiving a request to reinitiate the transmission from the user through a second network, and dividing the media stored after the interruption into segments and assigning a priority to each segment. The stored media is transmitted leaving out segments with priority lower than a threshold priority.

In accordance with yet another embodiment of the present invention, a media distribution server comprises a non-volatile memory configured to store the media after a service interruption, and a processor configured to divide the stored media into segments and to assign a priority to each segment, the processor further configured to select stored media leaving out segments with priority lower than a threshold priority. The server further comprises a receiver configured to receive media from a media server and requests to reinitiate transmission from the media distribution server, and a transmitter configured to render received media from the media server and the selected stored media.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
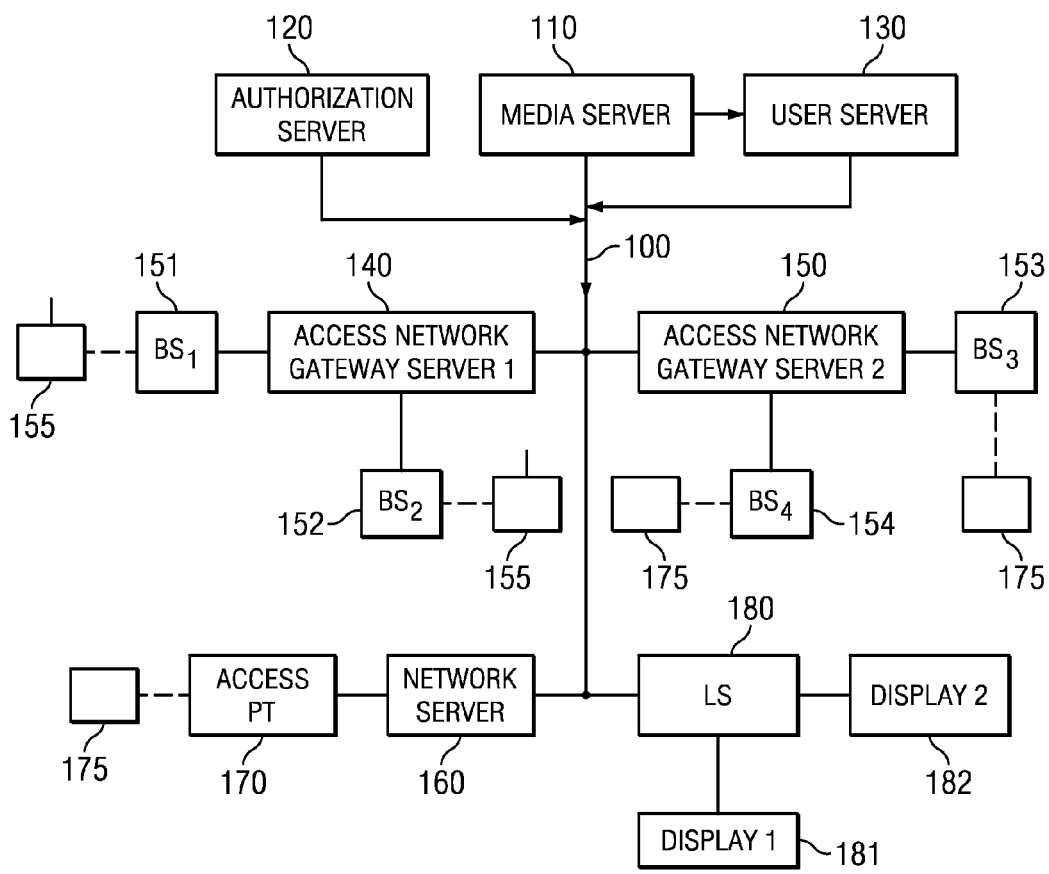
FIG. 1 illustrates a media distribution network with service continuity in accordance with an embodiment of the invention.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely media distribution of live events during service continuity. The invention may also be applied, however, to other types of media distribution.

Service continuity is the uninterrupted user experience of a service that is using an active communication (e.g., an ongoing voice call) when a user equipment undergoes a radio access technology change or a circuit switched/packet switched domain change without, as far as possible, the user noticing the change. In particular, service continuity encompasses the possibility that after a radio access technology/domain change the user experience is maintained by a different telecommunication service (e.g., tele- or bearer service) than before the radio access technology/domain change.

Uninterrupted user experience is the goal of service continuity. Such experience is often desired by users. For example, a user who is watching a movie in a first room may want to move to a second room to watch the remainder of the movie. The user turns off the display in the first room, goes to the second room, and turns on a different display in that room. The movie resumes playing from the point where it stops in the first room, so the user can continuously enjoy the movie without missing any single part. As another example, a user watching live television at home would like to continue watching when traveling. In such a scenario, the user turns off the television set at home, and turns on a smart phone. The user continues to watch on the smart phone from where it is stopped at home, without missing anything.

With service continuity, the continuation of an existing service when moving from one location or network to another is enabled. For video-on-demand (VoD) programs, this continuation capability greatly improves the user experience, and gives the flexibility to watch one VoD program at several time segments and at different locations, though the experience is pretty much like watching it continuously at one location.

For live events or programs (for example, live sports program, or live concerts/shows), service continuity also gives users the flexibility to watch the complete program continuously at several time segments and at different locations. However, service continuity introduces an unwanted "time gap" for live programs. This is because service resumes from a previously stopped time. During the service disruption or deactivation (time between stop in service and service resumption), the live program continues to advance forward. The time of disruption creates the "time-gap."

Similarly, when moving from one location or network to another, although the playing is paused during the transition, the live program still progresses. When the service is resumed, it resumes at the point where it was stopped last time, not at the point where the live program currently is at. Consequently, the user is watching a program which is several seconds, or minutes, or even more delayed, than most other users, for a live program.

In various embodiments, the invention solves the time gap problem and reduces or eliminates the time gap without losing the benefits from service continuity. In service continuity, when the service is moved, the point where the last session is stopped is recorded and the stopping point information of the last session is communicated to the new session. This enables the new session to resume from the prior stopping point.

Various embodiments of the invention disclose a content processing module to analyze the media content starting from the stopping point of the last session. The media is broken into smaller segments of short duration. Each segment is analyzed independently and classified into multiple priorities.

In various embodiments, based on the assigned priority, certain segments are removed from the media content. The media thus modified is transmitted to the user. The user experience is not degraded because the user does not observe an accelerated frame rate as observed during a fast-forward. As each least important small segment is removed, the duration of each media frame is unchanged but the presentation time shifts reducing the time gap.

A monitor continuously tracks the current time gap. The initial time gap is the time difference between the starting point of the new session and the end point of the last session. Each time a least important small segment is removed, the time gap is updated by a reduction of the play time of the removed small segment. When the time gap is reduced to zero, the content processing module stops, and from this point, the media stream is transmitted to the user directly. Having eliminated the time gap, the user receives the media as if the user had not undergone a service continuity transfer. Consequently, adding a content processing module to the service continuity enhances a user's experience.

Embodiments of the invention will be described using FIGS. 1-4 of which FIG. 1 illustrates an embodiment of the system and FIGS. 2-4 describe methods of media distribution. FIG. 5 illustrates an embodiment of an apparatus used for the media distribution.

FIG. 1 illustrates a media distribution network with service continuity in accordance with an embodiment of the invention.

Referring to FIG. 1, a media server 110 is configured to stream data such as media files, audio/video data, etc. through a network using a channel 100. The media server 110 may be an internet server on the web, a content server for a cable television provider, a satellite, or a land based television broadcasting station. The media server 110 may, upon authorization from the authorization server 120, deliver media to a user. The authorization server 120 may include both authorization and accounting to determine quota/bandwidth and the like allowed for the user, if any.

In various embodiments, a user server 130 is coupled through a network 100 to the media server 110. The user server 130 may be a network server or a specialized server for media processing such as content processing module, metadata processor and the like.

The media server 110 and/or the user server 130 may be coupled to a user device or a display unit through any type of network. Examples include a user device communicating with the media server through a wired or wireless WAN or LAN network, wireless communications through a cell based network such as 3GPP or WiMax network.

In a first network, for example from a first provider, a first user device 155 may communicate through a first base station (BS1) 151 using a first access network gateway server 140. The first user device 155 (or a second user device 175) may also communicate with the media server 110 and/or the user server 130 through a second base station (BS2) 152 within the first access network gateway server 140. In a second network, for example from a second provider, first user device 155 (or a second user device 175) may communicate through a third base station (BS3) 153 using a second access network gateway server 150. The first user device 155 (or a second user device 175) may also communicate with the media server 110 and/or the user server 130 through a fourth base station (BS4) 154.

The first user device 155 or alternately a second user device 175 may communicate with the media server 110 and/or the user server 130 through a network server 160 via an access point 170. Examples of the network server 160 include using LAN, WAN, or other types of networking devices to connect to the worldwide web.

The first user device 155 or alternately a second user device 175 may also communicate with the media server 110 and/or the user server 130 through a local server 180. The local server 180 may be coupled to a plurality of displays through a wired or wireless means. Examples include first display 181 and second display 182, which may be liquid crystal displays, computer CRT screens, television screens, projectors, etc. Examples of local servers 180 include home network servers, home computers, recording stations such as digital video recorders and others.

In various embodiments, the user server 130 is a separate device connected to the media server 110. In some embodiments, the user server 130 may be integrated within the media server 110. In other embodiments, the user server 130 may be integrated with local servers 180 at the user end. Alternatively, the user server 130 may be added within any of the networks, e.g., coupled to the network server 160, or the first or the second access network gateway servers 140 and 150.

Figure 2:
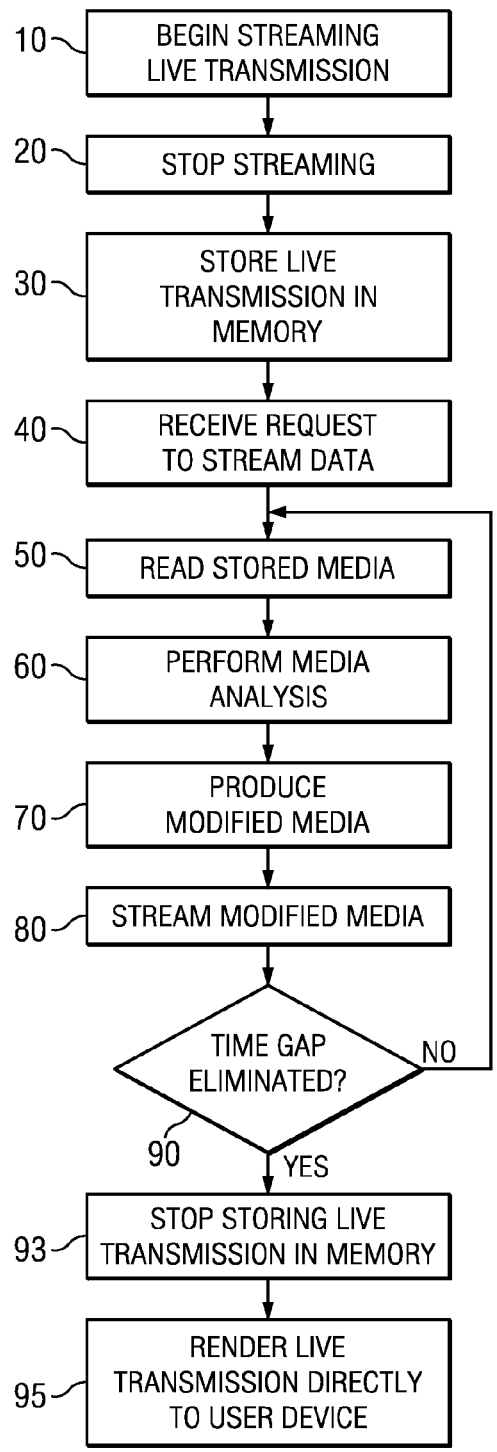
FIG. 2 illustrates a method of rendering media to a plurality of user devices in accordance with an embodiment of the invention.

FIG. 2 illustrates a method of rendering media to a plurality of user devices in accordance with an embodiment of the invention. The method is described using the network as illustrated in FIG. 1.

Referring to FIG. 2 (and as shown in FIG. 1), a media server 110 transmits media to a user server 130. The media server 110 may be coupled to the user server 130 through any suitable medium such as conductive and/or optical cables, wireless, or satellite based transmission.

The user server 130 streams media to a user through a first user device (box 10). The media is streamed through a network 100 which may include wireless channel and/or a wired network. Alternatively, the user server 130 may request media server 110 to stream media directly to the first user device 155. The rendering of the media is stopped (box 20). The stoppage may be initiated by the first user device 155 or alternatively, the first user device 155 may become unreachable due to various reasons. The user server 130 begins buffering or storing the transmission from the media server 110 in memory, preferably a non-volatile memory (box 30). A small portion of the media may be buffered to volatile memory as well. In some embodiments, all the live transmission is stored. In some embodiments, the media may be stored in the media server 110 itself. In one case, the user server 130 may save a bookmark or marker information so as to be able to access the point when transmission was stopped.

The user server 130 receives a request to reinitiate streaming the media from a second user device 175 (box 40). The first and second user devices 155 and 175 may be using different networks. For example, the first user device 155 may be connecting using a home network, a wireless communication network, a local area network, a wide area network, and a satellite communication network. Similarly, the second user device 175 may be connecting through a home network, a wireless communication network, a local area network, a wide area network, and a satellite communication network. The second user device 175 may be part of the same network as the first user device in one embodiment. In various embodiments, the first and the second user devices 155 and 175 are in different networks and even different types of network. In one embodiment, the first and second user devices may be connecting through different types of wireless networks. For example, the first user device 155 may be connecting through a 3GPP (or other mobile telecommunication network) networks and the second user device 175 may be connecting through a WiMax network.

The request from the second user device 175 may be authorized from an authorization server 120. The user server 130 begins to read the stored un-transmitted media that is being requested into its volatile memory (box 50).

In various embodiments, the state information identifying the last session and its terminations is transmitted to the media server 110. The state information is stored in the user server 130 or alternatively in an authorization server 120 or in a server in the network of the first user device 155. Alternatively, the second user device 175 may provide state information identifying the last session and its termination to the media server 110 in some embodiments. User state information from the second user device 175 will ensure that user continuity is maintained without interruption.

The user server 130 reads user preference information for the second user device 175. Alternatively, if the restart request is from the first user device 155, the user server 130 (or media server 110 if they are integrated together) reads the user preference of the first user device 155 or the user (box 340). The user preference information may include preference of what type of segments the user would like to skip (for example, slow motion review after goal shot in soccer games or commercials).

The user server 130 performs a media analysis of the un-transmitted media (box 60). When the request to reinitiate the previous session is received, a time gap exists between the media being streamed from the media server 110 and the point at which the last session was stopped.

The user server 130 divides the stored un-transmitted media into small segments, each segment comprising a plurality of frames in one embodiment. Segments could be partitioned based on shot detection, scene detection, or event detection, etc. Each segment is converted using content analysis, speech recognition, and content understanding, and assigned a priority value.

Each segment is assigned a priority value; for example, based on an average priority for all frames in the segment. In one embodiment, each frame within a segment is assigned a priority value based on the user preference information.

In one embodiment, the least important small segments of media content are identified. Such identification is realized by content analysis. The media content is decomposed into small segments such as shots, where a shot is a continuous sequence of frames recorded from a single camera. For each segment, an application running within the user server 130 examines features contained in the segment, and classifies it based on both the context and content. For example, in a basketball game, a timeout segment could be classified as least important. Alternatively, advertisements can be classified as least important.

Alternatively, if the content is already annotated with metadata, the user server 130 can take the advantage of the metadata to partition the media content into small segments, and assign priority values accordingly.

Thus, a modified media having only segments with priority above a user threshold is generated (box 70). This modified media is streamed to the second user device (box 80). Segments having a priority less than the user threshold are deleted or skipped. With time, the time gap between the media streamed from the independent server and the media server reduces. After the time gap is eliminated, the media from the media server 110 is directly relayed to the second user device 175.

In an alternative embodiment, the user server 130 may include the time that the live event ends, for example, the user may want to eliminate the time gap a few minutes before the end of the event. In such cases, the threshold may be changed adaptively by the user server 130. The user server 130 may also change the segment size in order to accomplish a faster or slower reduction in time gap.

In yet another alternative embodiment, the user server 130 may modify segments with lower priority and replace them with shortened segments. For example, a 30 second commercial or slow motion segment may be shortened to a 15 second segment. Similarly, shows could be edited to have scenes eliminated or replaced with shorter segments. In one embodiment, broadcasting of television shows may be accompanied with additional information, for example, meta tags that provide a priority for each segment. Using the meta tags or other such embedded information, a user could select to view the television show, e.g., extended version, normal version, and brief version, and the like. Viewers interested in everything may like to view the extended version, whereas viewers constrained for time may watch only the gist of the story and hence watch the brief version. In accordance with an embodiment of the invention, when a viewer watching an extended or normal version of the show has a time-gap, the user server 130 switches to the brief version until the time-gap is eliminated. In this way, a user viewing the show can catch up for the lost time without missing important content.

In some embodiments, the media server 110 may directly interact with the user devices. In such embodiments, the user server 130 may provide feedback to the media server 110; for example, a listing of segments to be removed while transmitting the media to the user devices.

The time gap is continuously monitored. When the time gap is eliminated, the media from the media server 110 is directly rendered to the second user device 175 and storing of the live transmission into the user server 130 can be stopped (boxes 90, 93, and 95).

Figure 3:
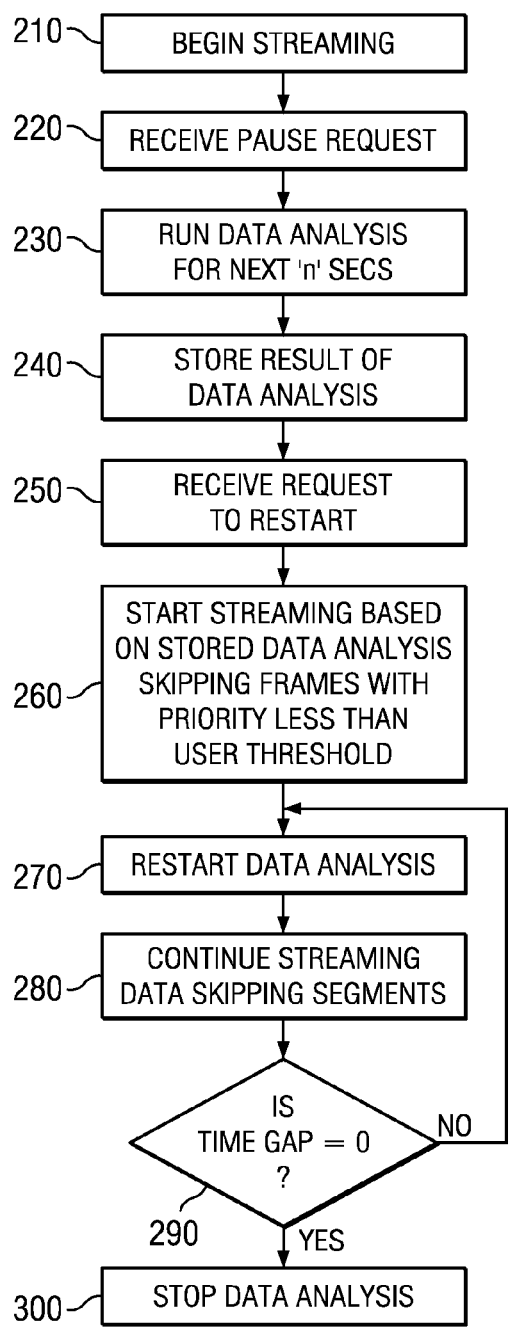
FIG. 3 illustrates a method of rendering media to a plurality of user devices in accordance with an embodiment of the invention.

FIG. 3 illustrates a method of rendering media to a plurality of user devices in accordance with an embodiment of the invention. The method is described using the network as illustrated in FIG. 1.

Referring to FIG. 3, a user server 130 streams media to a first user device 155 (box 210). The user server 130 receives a pause request from the first user device 155 or the service is interrupted to the first user device due to the first user device 155 being out of range (box 220). In one case, service interruption may occur due to lack of available signals through the communication channel. For example, service may be interrupted due to, e.g., user velocity, user location, network blockage, etc.

Referring to box 230, the user server 130 being coupled to the media server 110 performs a data analysis (contents processing). The memory of the user server 130 may include information about the first user device 155 and/or the user. At this stage, the user server 130 may perform data analysis for a limited amount of time. In various embodiments, this time is determined by user access conditions and time requirements for data analysis (box 230). This step is performed so that when the first user device 155 is reconnected or a request is made from a different device, media is immediately streamed without further delay. Referring to box 240, the result of the analyzed data is stored in memory within the user server 155.

During the data analysis, media is portioned into smaller segments which may range from about 10 seconds to a few milliseconds and each segment is analyzed individually. Each frame in a segment may be analyzed individually. Some segments may be further sub-divided. For example, in one embodiment, a long advertisement may be edited down so that only the name of the product and/or sponsor is seen by the user. Based on the user preference, a priority is assigned to each segment. Segments that fall below a threshold priority are noted. During subsequent streaming of the media to the first user device 155 or the same user through another device, these media segments that are below the threshold priority are not streamed.

Referring to box 250, the user server 130 receives a request to restart streaming the media. The user server 130, after authorization of the request, e.g., from an authorization server 120, and based on the stored data analysis immediately starts streaming modified media excluding certain segments (box 260). Simultaneously, the user server restarts data analysis of subsequent media (box 270), so as to maintain continuous streaming of modified data (box 280). The time gap between the live media streaming and the media being streamed to the user is monitored continuously (box 290). When the time gap is eliminated, the data analysis is stopped, and further streaming is provided directly (box 300).

Figure 4:
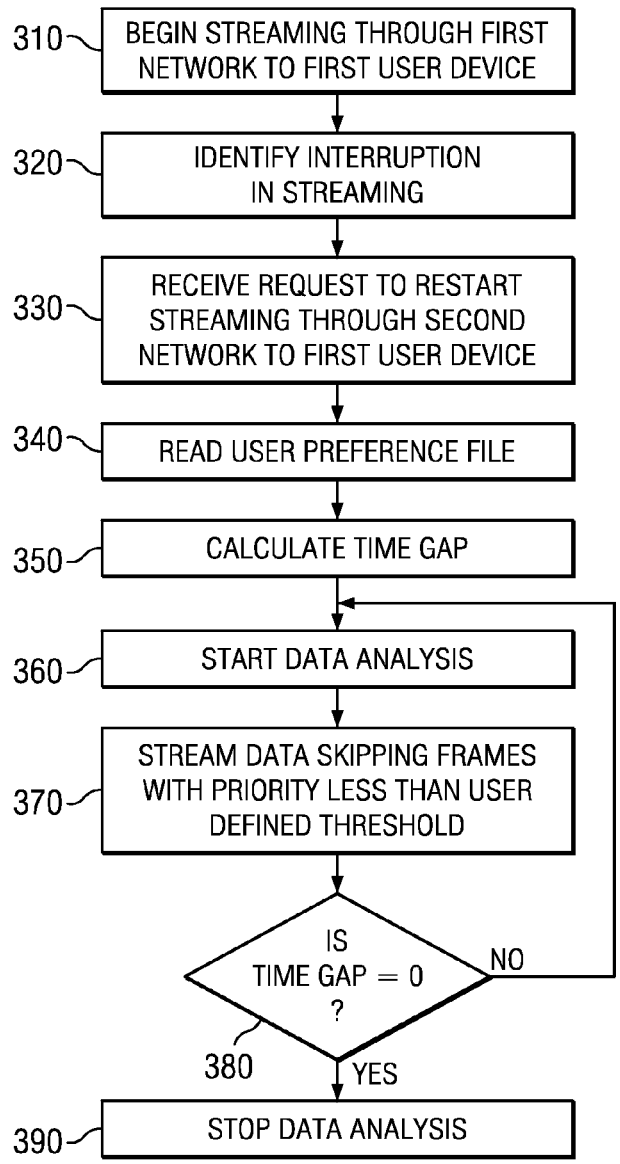
FIG. 4 illustrates a method of rendering media to a plurality of user devices in accordance with an embodiment of the invention.
Figure 5:
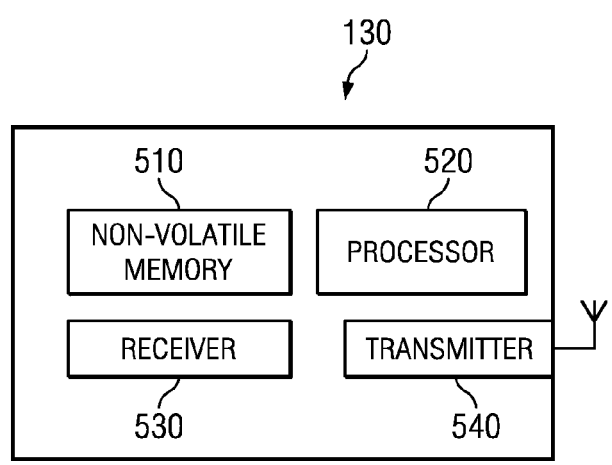
FIG. 5 illustrates a media distribution server in accordance with an embodiment of the invention.

FIG. 4 illustrates a method of rendering media to a plurality of user devices in accordance with an embodiment of the invention. The method is described using the network as illustrated in FIG. 1.

Referring to box 310 of FIG. 4, a user server 130 streams media to a first user device through a first network (box 310). The user server 130 receives a pause request from the first user device 155 or the service is interrupted to the first user device 155 due to the first user device being out of range (box 320). Referring to box 330, the user server 130 receives a request to restart session from the first user device 155 through a second network. The user server 130 reads the user preference information from the first user device 155 (box 340). The first user device 155 may also provide state information regarding the point when the previous session was lost.

Referring to box 350, the user server 130 calculates the time gap and performs a data analysis (contents processing) (box 360). A modified media is streamed to the first user device 155 requesting to restart the session (box 370). When the time gap is eliminated, the data analysis is stopped, and further streaming is provided directly (boxes 380 and 390), e.g., through the media server 110.

FIG. 5 illustrates a media distribution server in accordance with an embodiment of the invention.

Referring to FIG. 5, the user server 130 includes a non-volatile memory 510, a processor 520, a receiver 530, and a transmitter 540. The non-volatile memory 510, a processor 520, a receiver 530, and a transmitter 540 include common circuitry known in the art. The user server 130 may include standard features such as input/output ports, volatile memories, etc.

The receiver 530 receives media comprising a feed from a live event from a media server 110 and using the transmitter 540, the user server 130 transmits them to a user device or a display unit. After the session is disconnected, an application running on the processor 520 stores the incoming live feed into the non-volatile memory 510. The application running on the processor 520 divides the stored live feed into segments, assigns a priority to each segment, and selects important segments, leaving out segments with priority lower than a threshold priority. When a request to reinitiate the previous session is received, the user server 130 using the transmitter 540 transmits the selected live feed for the reinitiated session. The application may run prior to the request to reinitiate the previous session being received and/or simultaneously while transmitting the selected live feed.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of providing session continuity in a media distribution system during the interruption and resumption of a user's media session, the method comprising:
   transmitting a first portion of a media session to a user;
   interrupting the transmitting of the media session;

storing a remaining portion of the media session, which includes a portion of the media session not transmitted to the user in the first portion;

receiving a request to resume transmitting the media session to the user;

based on the received request to resume transmitting the media session, dividing at least a portion of the remaining media session into multiple segments and assigning a priority value to each segment; and transmitting a modified version of the remaining portion of the media session to the user by leaving out one or more segments with assigned priority value lower than a threshold priority.

2. The method of claim 1, wherein the media is an audio-video stream of a live event.

3. The method of claim 1, wherein transmitting a first portion of a media session to a user comprises transmitting to a first user device and wherein transmitting the modified version comprises transmitting to a second user device, wherein the first and the second user devices are different devices.

4. The method of claim 3, wherein the first user device is in a first network, and wherein the second user device is in a second network, the first and the second networks being different types of networks.

5. The method of claim 3, wherein the first user device is a stationary device, whereas the second user device is a mobile user device.

6. The method of claim 1, wherein transmitting a media to a user comprises transmitting to a first user device, and wherein streaming the modified version comprises streaming to the first user device.

7. The method of claim 1, wherein the threshold priority is defined by the user, and wherein assigning a priority to each segment comprises assigning a priority based on a user preference.

8. The method of claim 1, wherein assigning a priority to each segment comprises analyzing each frame of each segment using image recognition, and/or voice recognition.

9. The method of claim 1, wherein assigning a priority to each segment comprises using meta tags or other messages embedded within the segments.

10. The method of claim 1, wherein receiving a request to transmit comprises receiving a request to stream.

11. The method of claim 1, wherein storing a remaining portion of the media session comprises storing the remaining portion of the media session in a user server.

12. The method of claim 1, wherein transmitting a modified version of the remaining portion of the media session comprises leaving out the one or more segments and transmitting shortened media segments in place of the one or more segments.

13. A method of providing session continuity in distribution of live media where a user session is interrupted and restarted, the method comprising:

transmitting media of an ongoing event to a user, wherein the media is transmitted live so as to be transmitted at a same time as the ongoing event;

interrupting the transmission to the user;

storing the media of the ongoing event after the interrupting;

receiving a request to reinitiate the transmission of the media to the user;

dividing the media stored after the interruption into segments and assigning a priority to each segment;

transmitting the stored media leaving out segments with a priority lower than a threshold priority until the media being transmitted is live again with respect to the ongoing event; and transmitting the media to the user without leaving out segments after the media being transmitted is live again.

14. The method of claim 13, further comprising:

calculating a time gap between the ongoing event and the transmitted stored media.

15. The method of claim 13, wherein transmitting the media of the ongoing event comprises transmitting through a first network and wherein transmitting the stored media leaving out segments comprises transmitting through a second network.

16. The method of claim 15, wherein the first network and the second network are different types of network.

17. The method of claim 16, wherein the first network is a network selected from the group consisting of a home network, a wireless communication network, a local area network, a wide area network, and a satellite communication network, and wherein the second network is a network selected from the group consisting of a home network, a wireless communication network, a local area network, a wide area network, and a satellite communication network.

18. The method of claim 15, wherein the media is transmitted through the first network to a first user device, and wherein the stored media is transmitted through the second network to a second user device, the first and the second user devices being different devices.

19. The method of claim 15, wherein the media is transmitted through the first network to a first user device, and wherein the stored media is transmitted through the second network to the same first user device.

20. A media distribution server comprising:

a non-volatile memory configured to store a media after a service interruption, wherein the media comprises a live media stream transmitted at a same time as an ongoing event;

a processor configured to divide the stored media into segments and to assign a priority to each segment, the processor further configured to select stored media leaving out segments with priority lower than a threshold priority;

a receiver configured to receive requests to reinitiate transmission from the media distribution server; and a transmitter configured to transmit the selected stored media until the media being transmitted is live again with the ongoing event, the transmitter configured to transmit the media without leaving out segments if the media being streamed is live again.

21. The media distribution server of claim 20, wherein the media distribution server is configured to communicate with a first user device through a first network, and with a second user device through a second network that is different than the first network.

22. The media distribution server of claim 21, wherein the first network is a network selected from the group consisting of a home network, a wireless communication network, a local area network, a wide area network, and a satellite communication network, wherein the second network is a network selected from the group consisting of a home network, a wireless communication network, a local area network, a wide area network, and a satellite communication network, and wherein the first network is a different type of network from the second network.

23. The media distribution server of claim 21, wherein the first network is a 3GPP network and the second network is a WiMax network.

24. The media distribution server of claim 21, wherein the media distribution server comprises a local server.

25. A method of providing session continuity in a media distribution system where a user session is interrupted and restarted, the method comprising:
   transmitting of a first portion of a media session to a user;
   interrupting the transmitting of the media session at a first time based on a received request that the user wishes to temporarily stop the media session;
   storing, in a user server, a time gap portion of the media session, wherein the time gap portion is based on the first time the media session is interrupted and a second time when receiving a request to restart transmitting of the media session;
   receiving a request to transmit the remaining media to the user;
   dividing the remaining media into segments and assigning a priority to each segment; and
   transmitting the remaining media leaving out segments with priority lower than a threshold priority.

26. The method of claim 25, wherein the time gap portion equals the remaining media.

27. The method of claim 25, further comprising transmitting the media to the user without leaving out any segments after a total time of the segments left out is equal a total time of the time gap portion.

28. The method of claim 25, wherein transmitting the first portion of a media session comprises transmitting through a first network and wherein transmitting the remaining media comprises transmitting through a second network that is different than the first network.

29. A method of providing session continuity in a media distribution system during the interruption and resumption of a user's media session, the method comprising:
   transmitting a first portion of a media session to a user;
   interrupting the transmitting of the media session;
   storing a remaining portion of the media session, which includes a portion of the media session not transmitted to the user in the first portion;
   receiving a request to resume transmitting the media session to the user;
   dividing at least a portion of the remaining media session into multiple segments;
   assigning a priority value to each segment; and
   transmitting a modified version of the remaining portion of the media session to the user by leaving out one or more segments with assigned priority value lower than a threshold priority.

30. The method of claim 29, wherein the dividing and assigning are performed after receiving the request to resume transmitting.

31. The method of claim 29, where the dividing comprises utilizing metadata annotated in content of the media session.

32. The method of claim 29, wherein the media is an audio-video stream of a live event.

33. The method of claim 29, wherein transmitting a first portion of a media session to a user comprises transmitting to a first user device and wherein transmitting the modified version comprises transmitting to a second user device, wherein the first and the second user devices are different devices.

34. The method of claim 33, wherein the first user device is in a first network, and wherein the second user device is in a second network, the first and the second networks being different types of networks.

35. The method of claim 33, wherein the first user device is a stationary device and wherein the second user device is a mobile user device.

36. The method of claim 29, wherein transmitting a media to a user comprises transmitting to a first user device, and wherein streaming the modified version comprises streaming to the same first user device.

* * * * *